US011064317B2

(12) United States Patent
Mazzarella et al.

(10) Patent No.: US 11,064,317 B2
(45) Date of Patent: Jul. 13, 2021

(54) SYSTEM FOR MAINTAINING SESSIONS FOR SEAMLESS PUSH-TO-TALK SERVICES

(71) Applicant: Mutualink, Inc., Wallingford, CT (US)

(72) Inventors: Joseph R. Mazzarella, Tolland, CT (US); Michael S. Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days.

(21) Appl. No.: 16/939,639

(22) Filed: Jul. 27, 2020

(65) Prior Publication Data

US 2020/0359178 A1    Nov. 12, 2020

Related U.S. Application Data

(60) Continuation of application No. 16/284,699, filed on Feb. 25, 2019, now Pat. No. 10,728,715, which is a
(Continued)

(51) Int. Cl.
*H04W 4/10* (2009.01)
*H04L 29/06* (2006.01)
(Continued)

(52) U.S. Cl.
CPC ........... *H04W 4/10* (2013.01); *H04L 65/1059* (2013.01); *H04L 65/1069* (2013.01);
(Continued)

(58) Field of Classification Search
CPC ........... H04L 65/1059; H04L 65/1069; H04W 28/0236; H04M 3/56
See application file for complete search history.

(56) References Cited

U.S. PATENT DOCUMENTS

| 8,442,506 B2 * | 5/2013 | Peacock | H04M 7/006 |
| | | | 455/416 |
| 10,021,540 B2 * | 7/2018 | Mazzarella | H04W 4/10 |
| | (Continued) | | |

OTHER PUBLICATIONS

International Search Report and Written Opinion of the International Searching Authority directed to related International Patent Application No. PCT/US2017/032931, dated Jul. 18, 2017; 11 pages.
(Continued)

*Primary Examiner* — Md K Talukder
(74) *Attorney, Agent, or Firm* — Sterne, Kessler, Goldstein & Fox P.L.L.C.

(57) ABSTRACT

Embodiments include a system, method, and computer program product for providing seamless PTT services to a user. In an embodiment, a push-to-talk (PTT) component provides, to the user, PTT services with a talk group through connectivity to a data channel in a mobile network. A voice monitoring component monitors attributes of data connectivity on the data channel to determine when a voice quality falls below a threshold. When the voice quality is determined to fall below the threshold, a connectivity component requests the user to switch the connectivity to a voice channel. Then, the connectivity component dials a telephone number through the voice channel to access a voice conference bridge that provides the PTT services. To provide the PTT services, the voice conference bridge sets up a routing path to a session initiation protocol (SIP) session for the talk group, and routes voice communication through the SIP session.

20 Claims, 6 Drawing Sheets

Related U.S. Application Data continuation of application No. 16/030,530, filed on Jul. 9, 2018, now Pat. No. 10,219,120, which is a division of application No. 15/581,757, filed on Apr. 28, 2017, now Pat. No. 10,021,540.

(60) Provisional application No. 62/338,666, filed on May 19, 2016.

(51) Int. Cl.
  *H04M 3/56*   (2006.01)
  *H04W 28/02*   (2009.01)
  *H04W 4/08*   (2009.01)

(52) U.S. Cl.
  CPC .......... *H04L 65/4061* (2013.01); *H04L 65/80* (2013.01); *H04M 3/56* (2013.01); *H04W 4/08* (2013.01); *H04W 28/0236* (2013.01)

(56) References Cited

U.S. PATENT DOCUMENTS

| | | | |
|---|---|---|---|
| 10,219,120 B2 | 2/2019 | Mazzarella et al. | |
| 10,728,715 B2 | 7/2020 | Mazzarella et al. | |
| 2001/0012357 A1* | 8/2001 | Mirashrafi | H04L 29/06 379/387.01 |
| 2004/0047460 A1* | 3/2004 | Adams | H04M 3/56 379/202.01 |
| 2004/0208186 A1* | 10/2004 | Eichen | H04L 41/0681 370/401 |
| 2008/0113692 A1* | 5/2008 | Zhao | H04B 15/02 455/574 |
| 2009/0100258 A1* | 4/2009 | Sung | H04M 1/72409 713/100 |
| 2009/0175193 A1* | 7/2009 | Shaffer | H04L 45/123 370/254 |
| 2009/0287784 A1* | 11/2009 | Haruna | H04L 51/08 709/206 |
| 2013/0250816 A1* | 9/2013 | Peacock | H04M 3/56 370/260 |
| 2014/0119267 A1* | 5/2014 | Santhanam | H04W 36/0007 370/312 |
| 2014/0141845 A1* | 5/2014 | Li | H02J 7/0086 455/573 |
| 2014/0300321 A1* | 10/2014 | Kim | H02J 7/00047 320/111 |
| 2014/0349698 A1* | 11/2014 | Burks | H04W 76/28 455/518 |
| 2015/0002079 A1* | 1/2015 | Jeong | H02J 7/04 320/107 |
| 2017/0237864 A1* | 8/2017 | Zhang | H02J 7/00047 455/573 |
| 2017/0256968 A1* | 9/2017 | Yoon | H01R 24/60 |
| 2017/0339535 A1* | 11/2017 | Mazzarella | H04L 65/1059 |
| 2018/0317058 A1 | 11/2018 | Mazzarella et al. | |
| 2019/0191281 A1 | 6/2019 | Mazzarella et al. | |

OTHER PUBLICATIONS

International Preliminary Report on Patentability of the International Searching Authority directed to related International Patent Application No. PCT/US2017/032931, issued Nov. 20, 2018; 7 pages.

\* cited by examiner

SYSTEM FOR MAINTAINING SESSIONS FOR SEAMLESS PUSH-TO-TALK SERVICES

CROSS-REFERENCE TO RELATED APPLICATIONS

This application is a continuation application of U.S. Nonprovisional patent application Ser. No. 16/284,699, filed Feb. 25, 2019, entitled Maintaining Sessions for Seamless Push-To-Talk Services, which is a continuation application of U.S. Nonprovisional patent application Ser. No. 16/030,530, filed Jul. 9, 2018, entitled System and Method for Seamless Push-To-Talk Services, which is a divisional application of U.S. Nonprovisional patent application Ser. No. 15/581,757, filed Apr. 28, 2017, entitled Voice Connectivity of Push-to-Talk Clients, which claims benefit of U.S. Provisional Patent Application No. 62/338,666, filed May 19, 2016, entitled Voice Connectivity of Push-to-Talk Clients, all of which are incorporated herein by reference in their entireties.

BACKGROUND

Field

Embodiments generally relate to providing Push-to-Talk (PTT) services through a PTT client operating on a device, and more particularly, to improving the PTT client's voice connectivity.

Background

Two-way radio devices provide users access to PTT services, particularly PTT voice communications. In a typical PTT voice communication system, such as a mobile radio system, the two-way radio devices enable users to exchange voice communications with others listening in. Those listening or participating in the conversation may be referred to as a talk group. For a mobile radio system, the talk group may be those tuned to a designated radio channel. In another example, a PTT talk group may be a logically defined voice communications group defined by a PTT user or operator that allows users to send and receive voice messages from other member users in the talk group. PTT voice communication systems are often used by first responders and other security, public safety, and private user groups to facilitate immediate and efficient voice communications within a radio network's coverage area.

PTT voice communication systems also support half-duplex communication methods where only one member of a talk group can transmit and speak at a time, while the remaining members listen. When the transmit channel is released, other members may push to talk, e.g., key a radio, and seize control of the transmitting function until the transmit function is released. To regulate who has the transmitting function, control signaling may be used to block other PTT users from transmitting. The signaling may be in- or out-of-band. In addition, voice activated detection (VAD) may be used, preventing transmission when voice signals are being received.

Client applications operating on mobile computing devices, such as smartphones, are available that provide PTT functionality among member users within a talk group. By providing PTT functionality, these client applications simulate the functionality of two-way radio devices. To provide the PTT functionality, these client applications utilize Voice over IP (VOIP) or other digital voice technologies to transmit voice data over data networks. Similar to radio-based PTT systems, IP-based PTT clients may implement half-duplex or full duplex communications and may control who is able to speak at any one time.

PTT clients operating on mobile computing devices, such as smartphones, typically provide PTT services using VoIP technology by connecting to a mobile broadband data channel within a mobile data network, such as a 4G network. Although these mobile data networks are rapidly being built and expanded, poor data coverage or degraded data coverage exists in many parts of the country, particularly in remote or sparsely populated locations. Poor data connectivity renders ineffective many of the benefits provided by the PTT clients. Particularly, poor data connectivity may degrade voice quality and render voice communication between members of a talk group unintelligible.

BRIEF SUMMARY

What is needed are system, method, and computer program product embodiments, or combinations and sub-combinations thereof, to provide seamless Push-to-Talk (PTT) services to mobile devices regardless of data coverage in a mobile broadband data network. Embodiments include implementing a PTT client on the mobile device that switches between a connectivity to a data channel or a voice channel depending on whether current connectivity provides good voice quality.

In an embodiment to provide improved and seamless PTT connectivity to a user, a system implements a PTT component, a voice monitoring component, and a connectivity component. The PTT component provides to a user PTT services with a talk group through connectivity to a data channel that accesses a mobile network. Then, the voice monitoring component monitors attributes of data connectivity on the data channel to determine when a voice quality falls below a threshold. When the voice quality is determined to fall below the threshold, the connectivity component requests the user to switch the connectivity from the data channel to a voice channel that accesses the mobile network. Upon receiving confirmation from the user, the voice connectivity component dials a telephone number through the voice channel to access a voice conference bridge that provides the PTT services.

In an embodiment to provide seamless PTT services by an agency system, the agency system implements a session setup component and a gateway setup component. The session setup component receives, through a mobile network, a telephone call from a computing device operated by a user, and an associated automatic number identification (ANI) identifying that user. The telephone call is initiated by the computing device when the computing device determines that voice quality to a talk group, from a plurality of talk groups associated with the ANI, over a data channel fell below a threshold. Then, the session setup component requests a multimedia application server to retrieve the plurality of talk groups based on the received ANI. Based on instructions received from the multimedia application server, the gateway component sets up a routing path to a session initiation protocol (SIP) session for each talk group from the plurality of talk groups. To provide the user PTT services with each talk group, the gateway component routes voice communications through a corresponding SIP session.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings are incorporated herein and constitute a part of this specification. In the drawings.

In the drawings, like reference numbers generally indicate identical or similar elements. Additionally, generally, the left-most digit(s) of a reference number identifies the drawing in which the reference number first appears.

DETAILED DESCRIPTION

As mentioned above, limited or unreliable data service may limit capabilities of PTT client applications on a mobile device. To deal with the limited or unreliable data service, embodiments monitor voice quality over the data channel to determine whether it degrades below a threshold. If the quality is degraded, embodiments provide an option to a user to dial in to a conference bridge over a voice channel. After dialing in, the conference bridge can support PTT over the voice channel.

System

Figure 1:
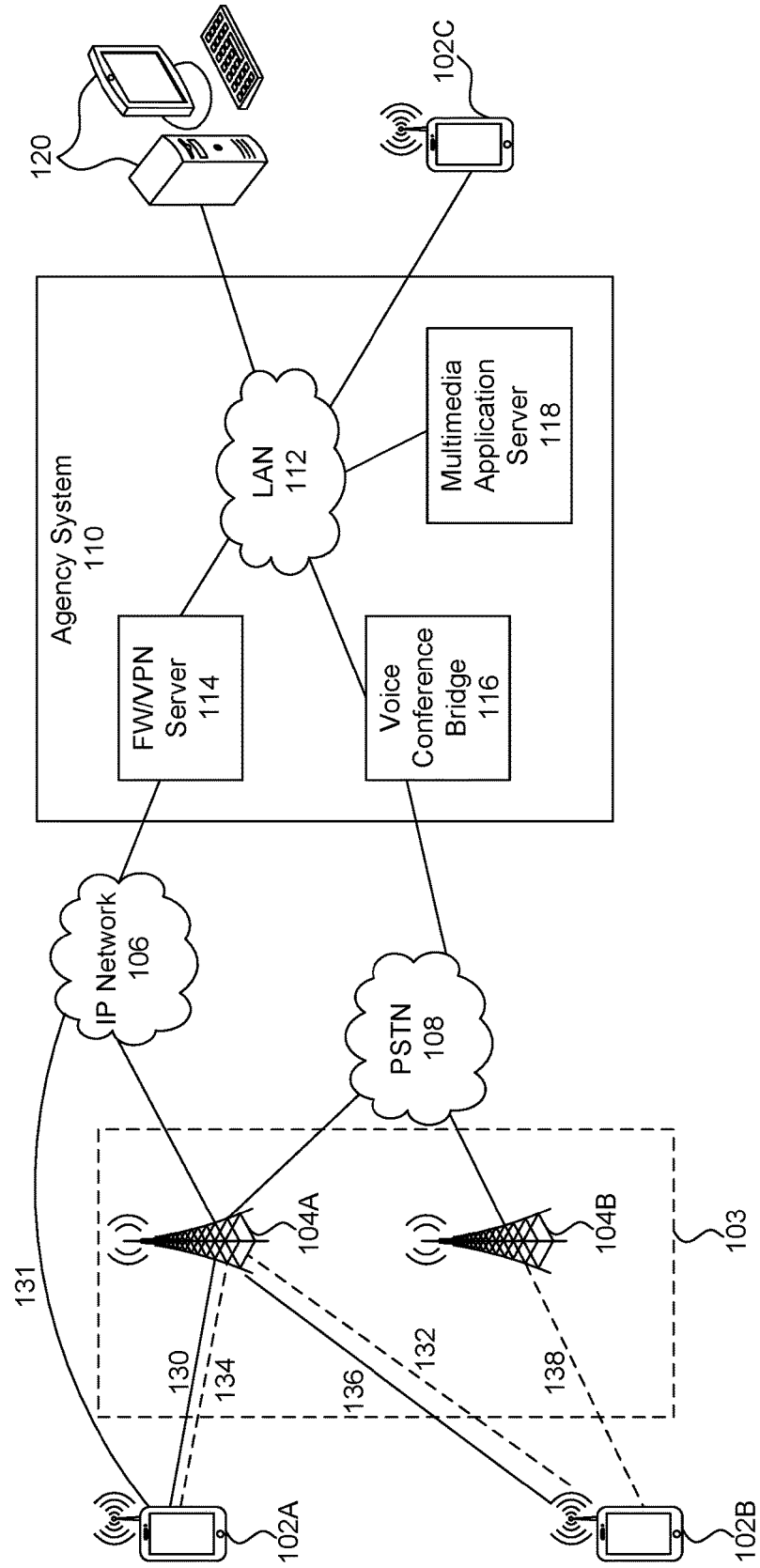
FIG. 1 is a block diagram illustrating a system for providing improved Push-to-Talk (PTT) connectivity in a mobile network, according to an embodiment.

FIG. 1 is a block diagram illustrating a system 100 for providing improved Push-to-Talk (PTT) connectivity in mobile network 103, according to an embodiment. As shown, system 100 includes mobile devices 102, base stations 104, Internet Protocol (IP) network 106, public switched telephone network (PSTN) 108, agency system 110, and PTT workstation 120. One or more of the devices, components, or systems shown and subsequently described may be implemented on one or more computing devices using hardware, software, or a combination thereof. Such a computing device may include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment.

Base stations 104, also referred to as base transceiver stations or radio base stations, provide users of mobile network 103 the ability to access one or more external networks such as IP network 106 or PSTN 108. Particularly, base stations 104 include telecommunications equipment to facilitate wireless multimedia communications between user equipment, such as mobile devices 102, and the one or more networks. In an embodiment, IP network 106 is representative of a wired network, wireless network, or a combination thereof, and includes any combination of local area networks (LANs), wide area networks (WANs), the Internet, or a radio-mobile network, etc. PSTN 108, sometimes referred to as the plain old telephone system (POTS), is representative of a collection of interconnected public telephone networks designed primarily for voice communications and related traffic. In an embodiment, PSTN 108 is a circuit-switched network in contrast to the packet-based network of IP network 106. Circuit-switched networks have been traditionally implemented to provide consistent and persistent voice communications.

Base stations 104 each include transceiver equipment for supporting one or more wireless data communication technologies and related networks, each of which is part of IP network 106. Such technologies and related networks include, without limitation, 4G Long-Term Evolution (LTE), 3G Code Division Multiple Access (CDMA), Worldwide Interoperability for Microwave Access (WiMAX), Wi-Fi, 3G Global System for Mobile (GSM), Enhanced Data (rates) for GSM Evolution (EDGE), High Speed Packet Access (HSPA) network, Universal Mobile Telecommunications System (UMTS), or other wireless wide area network (WAN) technologies.

Depending on the one or more types of wireless WAN technologies supported, base stations 104 implement different channel interfaces, e.g., data channels or voice channels, for facilitating wireless communications with mobile devices 102. Traditionally, wireless WAN technologies, e.g., GSM or CDMA, implement voice channels, which only or primarily service voice calls with very limited support and bandwidth for text or short message service (SMS) transmission. Base stations 104 traditionally route voice communications in voice channels through the circuit-switched networks of PSTN 108. Some wireless WAN technologies, e.g., CDMA, may also implement data channels, which support multimedia communications. Other wireless WAN technologies, e.g., 4G LTE may only implement data channels. Multimedia communication within data channels is routed through IP network 106.

As wireless WAN technologies have improved, data channels implemented by, e.g., 4G LTE technologies, have become reliable and fast enough to support persistent and high-quality voice data along with other multimedia data. In fact, 4G LTE does not implement voice channels, rather all types of data, including voice data, are transmitted via data channels. Moving voice data over the data channels and through data networks, such as IP network 106, enables more efficient use of the cellular spectrum since data channels are efficiently designed. Additionally, wireless technologies like 4G LTE improve voice quality by encoding voice data with High Definition (HD) audio codecs as voice packets are sent through the data channels.

Base stations 104 are readily being updated with more advanced wireless WAN technologies, e.g., 4G LTE, with support for efficient, high-bandwidth data networks However many base stations 104, such as those in sparsely populated locations, are still utilizing legacy wireless WAN technologies, e.g., GSM, that do not provide sufficient or any multimedia data coverage. For example, base station 104B may support only a legacy technology, such as GSM, that provides to mobile device 102B voice communication over voice channel 138. Base station 104B may route voice communications to and from mobile device 102B with other devices via PSTN 108. In contrast, base station 104A may, for example, support CDMA, which may provide both voice channels 132-134 and data channels 130-132 to mobile devices 102. But, as a user operating mobile device 102B moves further away from base station 104A, mobile device 102B may lose data connectivity to base station 104A via data channel 136. If this happens, mobile device 102B can only connect to mobile network 103 through voice channel 138 provided by base station 104B.

In an embodiment, mobile devices 102 implements a PTT client application for providing PTT services and improved voice connectivity to users operating respective mobile devices 102. To support PTT services and improved voice connectivity, each of mobile devices 102 is a computing device having one or more network chips for communicating with base stations 104. Each of the network chips includes transceiver hardware for supporting one or more wireless WAN technologies. In an embodiment, voice communication provided by PTT services is provided via IP network 106, a technology known as Voice over IP (VOIP). As such, mobile devices 102, such as mobile device 102A, provide PTT services and related functionality by connecting to IP network 106 via, for example, a Wi-Fi link 131 or through data channel 130 provided by base station 104A. By connecting to IP network 106, mobile devices 102 not only communicate voice data via VOIP, but also communicate video, text, files, or other multimedia communication with other users accessing IP network 106 and within the same one or more talk groups in which users operating mobile devices 102 belong. Although communicating multimedia content is useful, users often highly value voice communications because of its immediate and interactive nature.

In an embodiment to provide improved and persistent voice connectivity, the PTT client application on, for example, mobile device 102B, monitors a quality of data received via, for example, data channel 136 to estimate or determine a quality of current voice communication between member users of one or more talk group. If the voice quality falls below an acceptable threshold level, the PTT client application requests the user to connect to mobile network 103 via one of voice channels 132 or 138. If the user confirms the switch to, for example, voice channel 132, the PTT client application dials a pre-programmed telephone number to agency system 110. Upon receiving the telephone call, agency system 110 sets up voice communication paths between the calling device, mobile device 102B, and each talk group associated with the user operating mobile device 102B. When data connectivity to a data channel improves, the PTT client application asks the user whether he or she would like to switch back to data connectivity to access multimedia content, which includes voice communication among other types of content.

As discussed above, PTT services are particularly useful to users that need to facilitate immediate and efficient voice communications within one or more PTT talk group. For example, PTT services support full-duplex or half-duplex communication functions where a user of a talk group may communicate with each member of that talk group by activating a call, a button, or other voice transmission means. Users of mobile devices 102 may be, for example, first responders and other security, public safety, and private user groups.

Mobile devices 102 include, but are not limited to smartphones, laptops, tablets, or other portable devices. Each of mobile devices 102 includes an operating system that includes, but is not limited to, for example, the iOS platform produced by Apple Inc. of Cupertino, Calif., the Android platform produced by Google Inc. of Mountain View, Calif., the Windows platform produced by Microsoft Corp. of Redmond, Wash., the Blackberry platform produced by Blackberry Ltd. of Ontario, Calif., or the open-source Linux platform among other platforms. The operating system of, e.g., mobile device 102A, runs the PTT client application downloaded on or implemented within mobile device 102A. The PTT client application is downloaded from, for example, agency system 110 via IP network 106.

Agency system 110 is a computer-based system that includes one or more servers for providing PTT services to users associated with talk groups managed by agency system 112. For example, for users that are policemen, emergency medical service (EMS) personnel, or construction workers, agency system 110 may represent a command center at a police station, an ambulance service facility, or a construction office, respectively. In an embodiment, agency system 110 is implemented partly or entirely in a cloud-based computing environment, such as a private cloud, a government security cloud, US army cloud, or an Amazon cloud, etc. To provide the PTT services, agency system 110 includes FW/VPN server 114, voice conference bridge 116, and multimedia application server 118, each of which is connected to local area network (LAN) 112. LAN 112 is implemented as a wired network, a wireless network, or a combination thereof.

FW/VPN server 114 includes one or more processors for establishing virtual private network (VPN) tunnels or secure communication means between computing devices, such as mobile devices 102 or workstation 120, running respective PTT client applications. A VPN tunnel enables data, including PTT voice communications and multimedia content, communicated between PTT client applications and through IP network 106 to remain encrypted, which increases privacy and security for communication between user members of a talk group. In an embodiment, FW/VPN server 114 provides end-to-end encryption using one or more of hardware FPG-based or software-based encryption algorithms, such as AES256, as would be apparent to a person having ordinary skill in the art. In an embodiment, FW/VPN server 114 provides secure communication means by encrypting data sent to and from FW/VPN server 114.

FW/VPN server 114 further includes firewall functions for monitoring and controlling incoming and outgoing network traffic to and from agency 110. In an embodiment, firewall functions are implemented in a separate firewall server coupled to FW/VPN server 114 or be implemented within multimedia application server 118.

Voice conference bridge 116 is implemented by one or more servers or processors to provide to mobile devices 102 PTT services over PSTN 108. In an embodiment, when one of mobile devices 102, such as mobile device 102B, switches connectivity from a data channel to a voice channel, such as voice channel 138, voice conference bridge 116 receives a telephone call and an automatic number identification (ANI) identifying the calling device, mobile device 102B. To provide PTT services over PSTN 108, voice conference bridge 116 sends the ANI and a corresponding request to multimedia application server 118 to set up a voice communication session, such as a Session Initiation Protocol (SIP) session, for each talk group in which the user of mobile device 102B belongs. Multimedia application server 118 may not need to set up a new voice communication session to a talk group if a session already exists.

In an embodiment, voice conference bridge 116 receives instructions or results from multimedia application server 118. Based on the received information, for each talk group of the user, voice conference bridge 116 sets up a routing path to a voice communication session to access that talk group. The voice communication session is an existing session or a newly created voice communication session. Voice conference bridge 116 may further implement PTT functions to support, for example, PTT duplex-mode voice communications. By the process described above and further described with respect to FIGS. 3 and 5, voice conference bridge 116 effectively maintains and manages a separate voice conference for each talk group provided by agency system 110.

Multimedia application server 118 includes one or more processors to manage talk groups provided by agency system 110. In an embodiment, multimedia application server 118 creates one or more talk groups and amends user memberships within each talk group. To manage membership of talk groups, multimedia application server 118 includes a database to store associations between users and talk group membership. The database also stores associations between a talk group and its current members.

In an embodiment, when multimedia application server 118 receives a request for PTT communications from, for example, mobile device 102B via IP network 106, multimedia application server 118 sets up a multimedia communication session, such as a multimedia SIP session, between mobile device 102B and agency system 110. That multimedia communication session may access one or more talk groups in which the user belongs and that are managed by multimedia application server 118. If the multimedia communication session was previously set up or configured, multimedia application server 118 directly routes PTT voice communications (and other multimedia content) between mobile device 102 and the requested talk group via the configured multimedia communication session.

In an embodiment, multimedia application server 118 also services PTT communication through a similar mechanism for devices, such as workstation 120 or mobile device 102C, running respective PTT client applications and directly accessing LAN 112. Workstation 120 may be, for example, a desktop computer used by an operator at agency system 110 to communicate with field personnel within one or more talk groups and operating respective mobile devices 102. In an embodiment, mobile device 102C represents an IP phone directly coupled to LAN 112 or a portable computing device accessing a Wi-Fi network (not shown) that is coupled to LAN 112.

In an embodiment, multimedia application server 118 provides PTT communications to mobile devices 102, such as mobile device 102B, over PSTN 108 via voice conference bridge 116 by setting up a voice communication session, such as a voice SIP session, for each talk group in which the user is a member. In an embodiment, when a voice communication session has been previously configured for a talk group, multimedia application server 118 sends indication of that voice communication session to voice conference bridge 116 instead of instantiating a new voice communication session. Upon configuring or setting up a voice communication session for a respective talk group, any PTT voice communication request from one or more mobile devices 102, operating over respective voice channels, is routed through that voice communication session.

In an embodiment, a third party system that interfaces with agency system 110 provides some or all of the agency system's PTT services and associated functionality. For example, services provided by voice conference bridge 116 may be implemented and provided by a third-party, such as an external PTT services vendor. To interface with an external voice conference bridge 116, agency system 110 implements a conference bridge interface component within multimedia application server 118 or another server. In an embodiment, the third-party vendor is a voice service provider (VSP), also known as an internet telephony service provider (ITSP), that communicates voice data using VOIP. In other words, the VSP may communicate voice data with agency system 110 via IP network 106.

Figure 2:
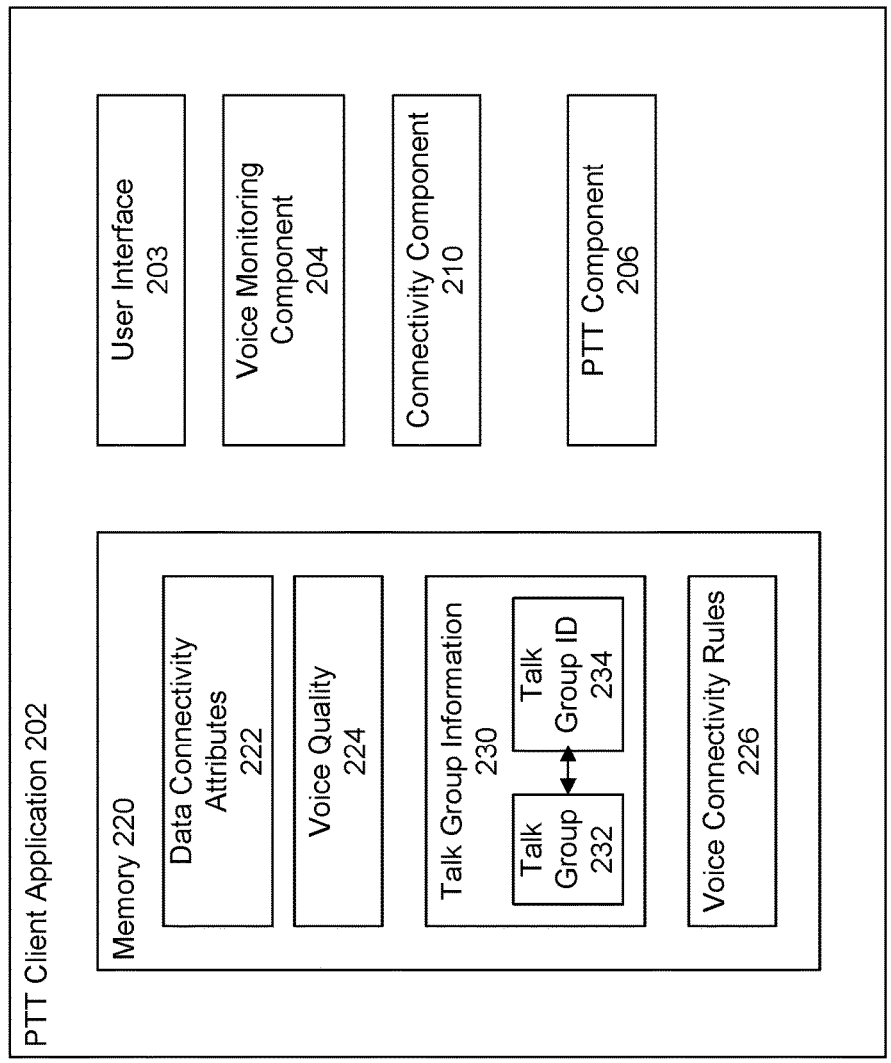
FIG. 2 is a block diagram illustrating a PTT client application, according to an embodiment.

FIG. 2 is a block diagram illustrating a PTT client application 202 for providing seamless PTT communication and improving voice connectivity, according to an embodiment. In an embodiment, PTT client application 202 is an exemplary implementation of a PTT client application downloaded on or implemented within one or more mobile devices 102 of FIG. 1 and workstation 120 of FIG. 1. For ease of reference, the following descriptions will reference the devices and systems of FIG. 1.

In an embodiment, a computing device, such as one of mobile devices 102 or workstation 120, includes one or more processors for implementing components of PTT client application 202 to provide improved PTT voice connectivity and communications. For ease of understanding, descriptions of the components of FIG. 2 may refer to FIG. 1. A component of PTT client application 202 may include a selection of stored operations that when executing in the one or more processors causes the one or more processors to perform the operations of that component.

In an embodiment, to support improved voice connectivity, PTT client application 202 implements the following components: user interface 203, voice monitoring component 204, PTT component 206, and connectivity component 210. To support the operations of the components, PTT client application 202 includes memory 220 for storing data connectivity attributes 222, voice quality 224, voice connectivity rules 226, and talk group information 230.

User interface 203 enables a user operating PTT client application 202 to access talk groups in which the user is a member. For example, user interface 203 presents the user with PTT interface 303 on mobile device 302A of FIG. 3. As shown, user interface 203 displays each of the user's talk groups as talk group icons 304A-D, PTT buttons 305A-D coupled to respective talk group icons 304A-D, and the number of active members of each group. User interface 203 may also indicate which of the talk groups are currently activated, e.g., receiving or transmitting voice communication, by highlighting or marking the associated talk group icon 304. User interface 203 further detects whether one of PTT buttons 306 is being selected. In an embodiment, detection depends on a type of the computing device operating PTT client application 202. For example, the selection may be detected on a touch on a touchscreen, a click by a mouse, a sequence of characters entered via a keyboard, or other input means.

In an embodiment, user interface 203 also prompts a user to switch between a connectivity to a voice channel or a data channel for providing the PTT services. As shown in PTT interface 303, user interface 203 shows current connectivity 308 as voice-only data, i.e., connectivity provided via a voice channel. The prompting may be initiated by connectivity component 210 when the voice channel provides better PTT voice connectivity than the data channel, as further described below. In an embodiment, connectivity component 210 initiates the prompting when the PTT voice connectivity provided by the data channel degrades below an acceptable threshold.

Voice monitoring component 204 monitors attributes of data connectivity on a data channel for communicating with agency system 110 to determine a voice quality, saved as voice quality 224 in memory 220. Similarly, the monitored attributes are saved as data connectivity attributes 222. In an embodiment, monitored data connectivity attributes 222 include one or more of: a packet response time, a signal strength, a network speed, a packet loss rate, an available bandwidth, jitter, or a ping. In an embodiment, regardless of whether PTT client application 202 is currently providing PTT services via a voice channel or a data channel, voice monitoring component 204 continues to periodically monitor data connectivity attributes 222.

To determine voice quality 224, voice monitoring component 204 computes a value representing data connectivity quality based on one or more of the monitored or measured data connectivity attributes 222. Then, voice monitoring component 204 uses the determined data connectivity quality to compute voice quality 224 provided during the PTT voice communications. Voice quality 224 may be a score determined to estimate the voice transmission's fidelity based on attributes 222. In an embodiment, voice monitoring component 204 additionally monitors or measures attributes of voice data received within the data channel to compute voice quality 224. Attributes for voice data may include, for example, jitter, response time, packet loss, echo, clock drift, or synchronization measurements. These voice-specific attributes may also be stored as data connectivity attributes 222.

In an embodiment, voice quality 224 is determined based on whether a certain number of the monitored data connectivity attributes 222 are at an acceptable level, e.g., falling within a range of values. In an embodiment, if any of the monitored data connectivity attributes 222 is not at or within an acceptable level, then voice monitoring component 204 determines that voice quality 224 is poor. In another embodiment, voice quality 224 is computed as a function of data connectivity attributes 222. For example, if a monitored response time, an example of one of data connectivity attributes 222, exceeds a preconfigured threshold, then regardless of the values of the other data connectivity attributes, voice communications may have significant delays rendering PTT voice services unintelligible. In an example, voice monitoring component 204 may determine voice quality 224 is poor if PTT client application 202 has disconnected from connectivity to the data channel, rendering voice connectivity nonexistent.

In an embodiment, voice monitoring component 204 concurrently monitors not only the attributes of data connectivity on an available data channel, but also attributes for an available voice channel. For example, voice monitoring component 204 may monitor voice attributes of voice communications transmitted through a currently in-use voice channel. At the same time, voice monitoring component 204 may periodically send or receive short messages, e.g., pings or IP packets, to an agency system over the data channel. Then, voice monitoring component 204 computes or estimates respective voice qualities provided over the two separate channels. PTT client application 202, particularly connectivity component 210 described below, may use these computations to determine whether to prompt the user, via user interface 203, to switch to a connectivity channel that provides higher quality and persistent PTT voice connectivity.

Connectivity component 210 interfaces with one or more network chips on the mobile device, such as mobile device 102B, operating PTT client application 202. In an embodiment, connectivity component 210 detects at least a voice channel and at least a data channel provided by the one or more network chips for accessing mobile network 103.

Based on voice quality 224 computed by voice monitoring component 204, connectivity component 210 determines whether to connect to one of the voice channel or the data channel for providing improved PTT voice connectivity. In an embodiment, upon determining that voice quality 224 is unacceptable on a data channel, connectivity component 204 requests the user to confirm switching connectivity from the data channel to a voice channel for accessing mobile network 103. This may be useful because voice quality 224, which is computed from measured or monitored data connectivity attributes 222, does not necessarily correspond to a true voice quality.

In an embodiment, connectivity component 204 determines that voice quality 224 is poor or unacceptable if voice quality 224 falls below a threshold or is no longer within an acceptable range of values. To make these comparisons, connectivity component 204 may query voice connectivity rules 226 for saved thresholds or range of values.

When switching connectivity from a data channel to a voice channel upon confirmation from the user, connectivity component 210 automatically disconnects from the data channel and dials a telephone number over the voice channel to access PTT voice connectivity. The telephone call routes to voice conference bridge 116 identified by the telephone number. In an embodiment, the telephone number is pre-programmed within memory 220 or downloaded or received from agency system 110 that provides the PTT services. Upon dialing the telephone number and processing by voice conference bridge 116, connectivity component 210 routes PTT voice communications over the telephone call on the voice channel. In an embodiment, connectivity component 210 may switch connectivity from the voice channel to the data channel and vice versa without confirmation from the user.

In an embodiment, connectivity component 210 determines to switch connectivity from the voice channel back to the data channel if voice quality 224 is high on the data channel, e.g., voice quality 224 satisfies one or more thresholds or rules of voice connectivity rules 226. In an embodiment, PTT voice connectivity over the data channel is beneficial because the data channel enables users of PTT client application 202 to communicate multimedia content, which includes more types of information than voice communication.

Similar to the embodiments described above, when switching from the voice channel to the data channel, connectivity component 210 terminates the current telephone call over the voice channel to voice conference bridge 116. Then, connectivity component 210 directly contacts agency system 110, particularly multimedia application server 118, over the data channel to access the PTT services for each talk group in which the user is a member. When connecting to multimedia application server 118, connectivity component 210 sends information identifying and authenticating the user of PTT client application 202. Authentication information may include one or more of the following: an Internet Protocol (IP) address, a media access control (MAC) address, a username and a password combination, or an email address. Multimedia application server 118 uses this authentication information to set up PTT voice connectivity between the user of PTT client application 202 and the user's talk groups managed or maintained by agency system 110.

PTT component 206 provides, to the user, the PTT services with each talk group in which the user belongs. When PTT client application 202 is accessing the PTT services provided by agency system 100 via a data channel, PTT component 206 directs voice communications and other multimedia content to the selected talk group via IP network 106. For example, when the user selects a talk group icon, such as talk group icon 306A from FIG. 3, to talk to other members of the talk group represented by the talk group icon, PTT component 206 may send the voice communication to multimedia application server 118 for propagating to each member of the talk group. PTT component 206 may concurrently send a message, a sequence, or other identification information that specifies the selected talk group. In an embodiment, PTT component 206 searches for the specific talk group 232 stored in talk group information 230 to locate talk group ID 234, representative of the information identifying the respective talk group 232.

In an embodiment, when PTT client application 202 is accessing the PTT services provided by agency system 100 via a voice channel, PTT component 206 mutes a microphone with respect to PTT client application 202, mimicking the PTT functionality provided by traditional radio devices. PTT component 206 may mute the microphone until at least a PTT button, such as PTT button 306A, of a respective talk group, such as talk group "PATROL" displayed in talk group icon 304A, is activated or selected by the user.

In an embodiment, when a PTT button is activated, e.g., selected by the user, and detected by user interface 203, PTT component 206 searches talk group information 230 for talk group 232 associated with the activate PTT button. Based on talk group 232, PTT component 206 sends talk group ID 234 associated with the searched talk group 232 to voice conference bridge 116. In an embodiment, PTT component 206 looks up talk group 232 and associated talk group ID 234 in a separate table than when transmitting multimedia communications to agency system 110 over a data channel.

In an embodiment, by dialing into voice conference bridge 116, PTT component 206 effectively provides PTT services via a conference call. Therefore, talk group ID 234 may be a dual tone multi frequency (DTMF) command, e.g., a sequence of dialed numbers transmitted to voice conference bridge 116. But, other communication protocols and message types can similarly identify talk group 232 and be transmitted over the voice channel and PSTN 108.

In an embodiment, upon activating the PTT button, PTT component 206 unmutes the talk group corresponding to the activated PTT button. Voice communications from the user may then be transmitted to each other member of the talk group. In an embodiment, voice communications are continually sent over the voice channel to voice conference bridge. Upon activating the PTT button, PTT component 206 sends an unmute control along with talk group ID 234 to voice conference bridge 116. Unmute control may similarly be a DTMF command. Voice conference bridge 116 then unmutes voice communications from PTT client application 202 with respect to the talk group managed by agency system 110 and associated with the received talk group ID 234.

In an embodiment, when the user finishes speaking, she may deactivate the PTT button, e.g., stop pressing or reselecting the PTT button provided by user interface 203. Then, PTT component 206 may again mute PTT client application 202 with respect to the talk group coupled to the PTT button. In an embodiment where voice communications are continually sent to voice conference bridge 206, PTT component 206 sends a mute control to voice conference bridge 206. Much like the unmute control described above, the mute control may be the same or a different DTMF command.

Figure 3:
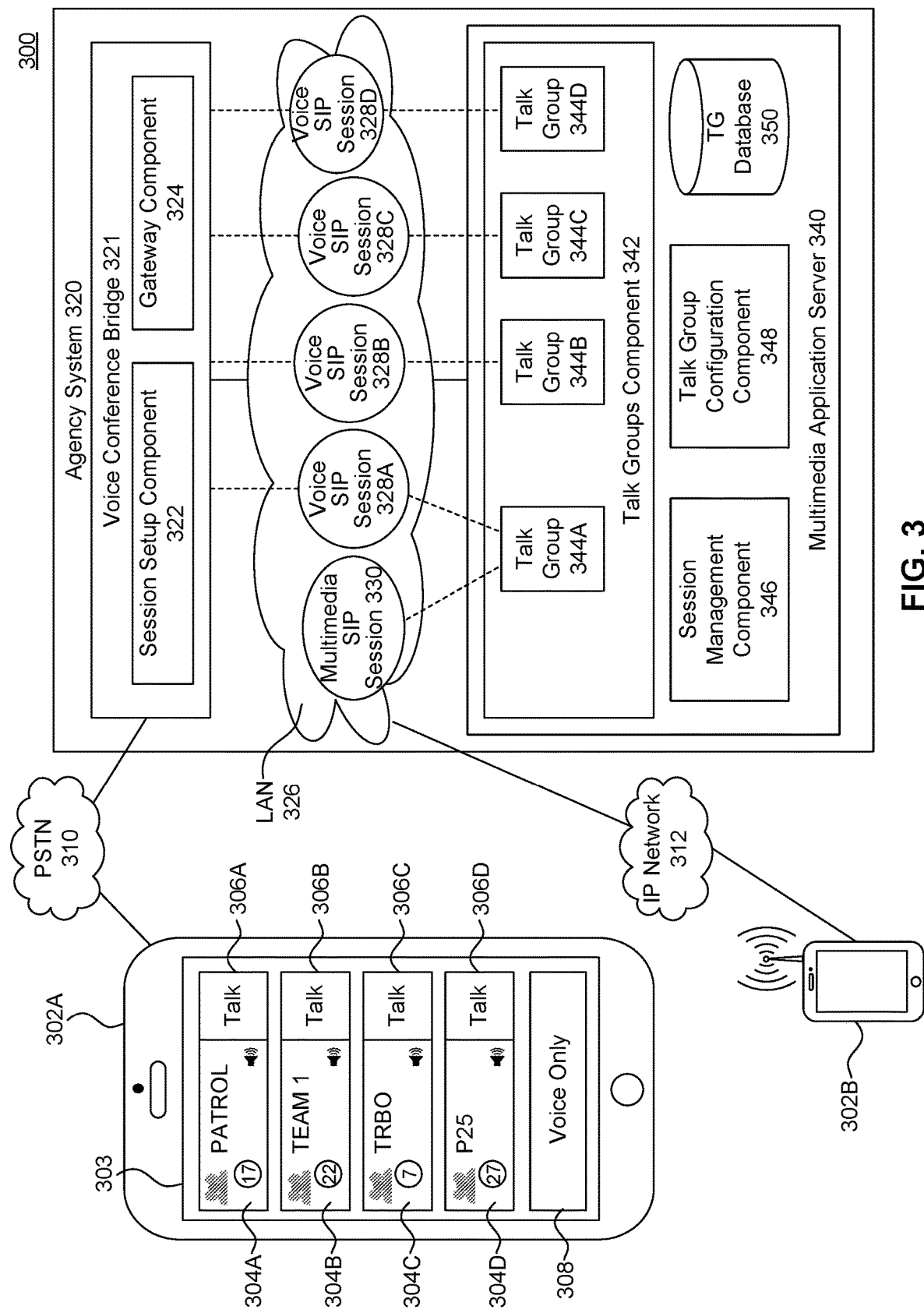
FIG. 3 is a block diagram illustrating how an agency system provides PTT services, according to an embodiment.

FIG. 3 is a block diagram of a system 300 that illustrates components of an agency system 320 that provides PTT services, according to an embodiment. System 300 includes mobile devices 302, IP network 312, PSTN 310, and agency system 320, each of which may correspond to the similarly named components of FIG. 1.

In an embodiment, PTT interface 303 depicts an example of user interface 203 of FIG. 2 provided to mobile device 302A. For a user operating mobile device 302A, PTT interface 303 displays one or more talk group icons 304 representing each of the user's talk group. PTT interface 303 also depicts PTT buttons 306 coupled to respective talk group icons 304. As described with respect to FIG. 2, the user may hold or select, for example, PTT button 306A to speak to the members of the talk group "PATROL" identified by talk group icon 304A. PTT interface 303 may additionally depict the number of active members currently within talk group icons 304. Similarly, the user may release or re-select, for example, PTT button 306A to deactivate PTT button 306A. Depending on the current connectivity 308, e.g., via a voice channel or a data channel, as depicted within PTT interface 303, the PTT client application, such as PTT client application 202, operating on mobile devices 302 provides the PTT services via PSTN 310 or IP network 312, respectively.

In an embodiment, agency system 320 includes voice conference bridge 321, LAN 326, and multimedia application server 340. Each of these components may correspond to the similarly named components of FIG. 1.

Multimedia application server 340 includes one or more processors to manage talk groups provided by agency system 320. In an embodiment, multimedia application server 340 implements session management component 346, talk group configuration component 348, talk group database 350, and talk group component 342. A component multimedia application server 340 may include a selection of stored operations that when executing in the one or more processors causes the one or more processors to perform the operations of that component.

Talk group component 342 maintains or manages talk groups 344 provided by agency system 320. In an embodiment, talk group component 342 also maintains or manages real-time multimedia content communicated within each of talk groups 344. Particularly, talk group component 342 enables member users within a talk group, such as talk group 344A, to communicate real-time multimedia communications for users communicating over IP network 312 and voice-only communications for users communicating over PSTN 310.

Talk group configuration component 348 enables an administrator of agency system 320 to create one or more talk groups and amend user memberships within each of talk groups 344. In an embodiment, membership management capabilities are provided to a user operating a PTT client application within mobile devices 302. To manage membership of talk groups, multimedia application server 118 includes talk group database 350 to store associations between users and their respective one or more talk group memberships. Talk group database 350 may also store data associating each talk group, such as talk groups 344, and its current members as well as active members. Each user can be identified in talk group database 350 based on one or more stored identification information.

In an embodiment, user identification information includes an email address or a username used to access a PTT client application operating on, for example, mobile device 302A. Identification information may also include, for example, an IP address or a MAC associated with mobile device 302A. In the context of a telephone call made over PSTN 310, user identification includes an automatic number identification (ANI) assigned to, for example, mobile device 302 and represents the caller's telephone number, i.e., a telephone number of mobile device 302. User identification information can be used to authenticate users to provide secure PTT services. Additionally, talk group database 350 may store authentication information such as a username and a password combination in order to authorize a user to access his one or more talk groups.

Session management component 346 sets up communication sessions within LAN 326 for mobile devices 302 requesting access to one or more of talk groups 344. In an embodiment, session management component 346 sets up a multimedia communication session, such as multimedia SIP session 330, for mobile device 302B requesting PTT services over IP network 312. For example, mobile device 302B may connect to IP network 312 via data channel 130 from FIG. 1. Thus, multimedia SIP session 330 can connect a user operating mobile device 302B to the user's talk groups, such as talk group 344A. Similarly, session management component 346 sets up a voice communication session, such as voice SIP session 328, for mobile device 302A requesting PTT service to talk group 344A over PSTN 310. For example, mobile device 302A may connect to PSTN 310 via voice channel 134 from FIG. 1.

SIP is a communication protocol commonly used in signaling and controlling multimedia sessions. Although SIP may be used to control voice and video calls, instant messaging, and other types of multimedia communication, other types of communications protocols may be used by session management component 346.

By maintaining multimedia SIP session 330 and, when needed, voice SIP session 328A, talk group component 342 improves the connectivity provided to each user communicating in, for example, talk group 344A. The flexibility of connecting to talk group 344A via IP network 312 or PSTN 310 further enables users' mobile devices 302 to pick the most stable and reliable connection such that each user maintains consistent connectivity to his talk group, such as talk group 344A. Depending on basestation locations, wireless technologies provided by nearby basestations, wireless interference among other factors, the more stable and reliable connectivity type may vary from user to user. Thus, at any instance, some users, such as the user operating mobile device 302B, may be connected to talk group 344A via multimedia SIP session 330, while other users, such as the user operating mobile device 302A, may be connected to talk group 344A via voice SIP session 328A.

In an embodiment, session management component 346 additionally authenticates a user requesting PTT services via mobile devices 302. Session management component 346 authenticates access by comparing received authentication or identification information with information stored in talk group database 330. When multimedia application server 340 receives a request for PTT communications from, for example, mobile device 302B via IP network 312, session management component 346 may first authenticate that user.

Upon authenticating the user, session management component 346 looks up the user, within talk group database 350, to identify one or more talk groups 344 in which the user is a member. Then, session management component 346 may set up, for example, multimedia SIP session 330 for accessing each of the user's talk groups. In the present example, multimedia SIP session 330 routes to talk group 344A. Upon setting up multimedia SIP session 330, multimedia communications within talk group 344A are routed to and from mobile device 302B via multimedia SIP session 330.

In an embodiment, session management component 346 receives a request from voice conference bridge 324 to set up voice communication sessions to provide PTT services to, for example, mobile device 302A over PSTN 310. In an embodiment, session management component 346 receives user identification information, such as an ANI, from voice conference bridge 321. Session management component 346 uses the received ANI to look up the user in talk group database 340 and each of the user's talk groups. Then, session management component 346 sets up a corresponding voice communication session, such as voice SIP sessions 328, for each of the user's talk groups. Session management component 346 may send the setup instructions including the voice SIP sessions 328A-D back to voice conference bridge 321.

In an embodiment, if multimedia SIP session 330 was previously set up or configured, session management component 346 may not need to re-create a multimedia communication session. In fact, the existing multimedia SIP session 330 may enable direct multimedia communications between IP mobile device 302B and talk group 344A via LAN 326. Similarly, a previously set up or configured voice communication session, such as voice SIP session 328B, enables mobile device 302A to communicate directly with talk group 344B via LAN 326 and voice conference bridge 321, as further described below.

In an embodiment, whenever a user terminates a telephone call, such as a call from mobile device 302A, session management component 346 receives a corresponding termination notice or message from voice conference bridge 321. Session management component 346 may further track the number of users sharing or using each voice communication session. In an embodiment, if no users are currently using a particular voice communication session, such as voice SIP session 328C, session management component 346 terminates that voice communication session. In an embodiment, the received termination notice itself indicates that zero users are being routed through that specific voice communication session.

Voice conference bridge 321 is implemented by one or more servers to provide PTT services over PSTN 310 to mobile device 302A and other devices dialing into voice conference bridge 321. In an embodiment, voice conference bridge 321 implements session setup component 322 and gateway component 324, each of which is implemented or executed by one or more processors. A component multimedia application server 340 may include a selection of stored operations that when executing in the one or more processors causes the one or more processors to perform the operations of that component.

Session setup component 322 provides the configuration steps that allow voice communications from mobile device 302A over PSTN 310 to be routed to one or more of the user's talk groups 344 managed in multimedia application server 340. In an embodiment, when mobile device 302A switches connectivity from a data channel to a voice channel, voice conference bridge 320 receives a telephone call from mobile device 302A over PSTN 310. Voice conference bridge 320 may additionally receive an ANI identifying the calling device, i.e., mobile device 302A.

To provide PTT services over PSTN 108, voice conference bridge 321 needs to route voice communications to the requested talk group. To do this, session setup component 322 sends a request, via LAN 326, to multimedia application server 340 to set up voice SIP sessions 328 that correspond to the user's talk groups. In an embodiment, the request includes user identification information, such as ANI, that enables multimedia application server 340 to look up the talk groups in which the user is a member. Each member user of a talk group is assigned information that identifies that same talk group. Thus, to provide PTT services for each member, voice conference bridge 321 routes voice communications from each member to voice SIP sessions 328 that correspond to that same talk group.

In an embodiment, session setup component 322 itself maintains a database of users and their one or more talk groups. In this example, session setup component 322 may locate the talk groups of the user and send a request to multimedia application server 340 to set up voice SIP sessions 328 that do not already exist.

In an embodiment, session setup component 322 receives instructions or results from multimedia application server 118 regarding setup voice SIP sessions 328. Based on the received information, for each talk group of the user, session setup component 322 sets up and saves a routing path to a voice communication session to access that talk group. The voice communication session may be an existing session or a newly created voice communication session. In an embodiment, one or more members of a talk group may share, for example, voice SIP session 328D, to access the corresponding talk group 344D. As long as one or more member users (within the same talk group) are accessing or dialed into the voice communication session of voice SIP session 328D, session setup component 322 continues to maintain voice SIP session 328D. A member user may dial into voice SIP session 328D by operating, for example, his mobile device 302.

Gateway component 324 implements PTT functions to support, for example, PTT half-duplex voice communications between a user, such as the user operating mobile device 302A, dialing over PSTN 310 and other members of the user's one or more talk groups. To enable voice communications to be sent between PSTN 310 and voice SIP sessions 328 over LAN 326, gateway component 324 performs gateway functions on the voice communications.

For example, when voice communications from another member of talk group 344C is processed by talk groups component 342, gateway component 324 may receive the voice communications via voice SIP session 328C. Gateway component 324 may further convert the voice communications for sending to mobile device 302A over PSTN 310. Similarly, when gateway component 324 transmits voice communications from PSTN 310 to talk groups component 342, gateway component 324 may convert the voice communications for sending over LAN 326.

In an embodiment, gateway component 324 receives a PTT activation command from mobile device 302A over PSTN 310. The PTT activation command may be, for example, a DTMF command that indicates mobile device 302A is requesting permission to transmit voice communications. In an embodiment, the PTT activation command includes an identification of a specific talk group, such as talk group "TEAM 1" displayed in talk group icon 304B. Gateway component 324 locates a specific routing path to transmit the user's voice communications to talk group 344B, which corresponds to the "TEAM 1." The routing path may have been previously set up and saved by session setup component 322. Upon locating the routing path to voice SIP session 328B for connecting to talk group 344B, gateway component 324 forwards voice communications from mobile device 302A to talk group 344B.

Method

Figure 4:
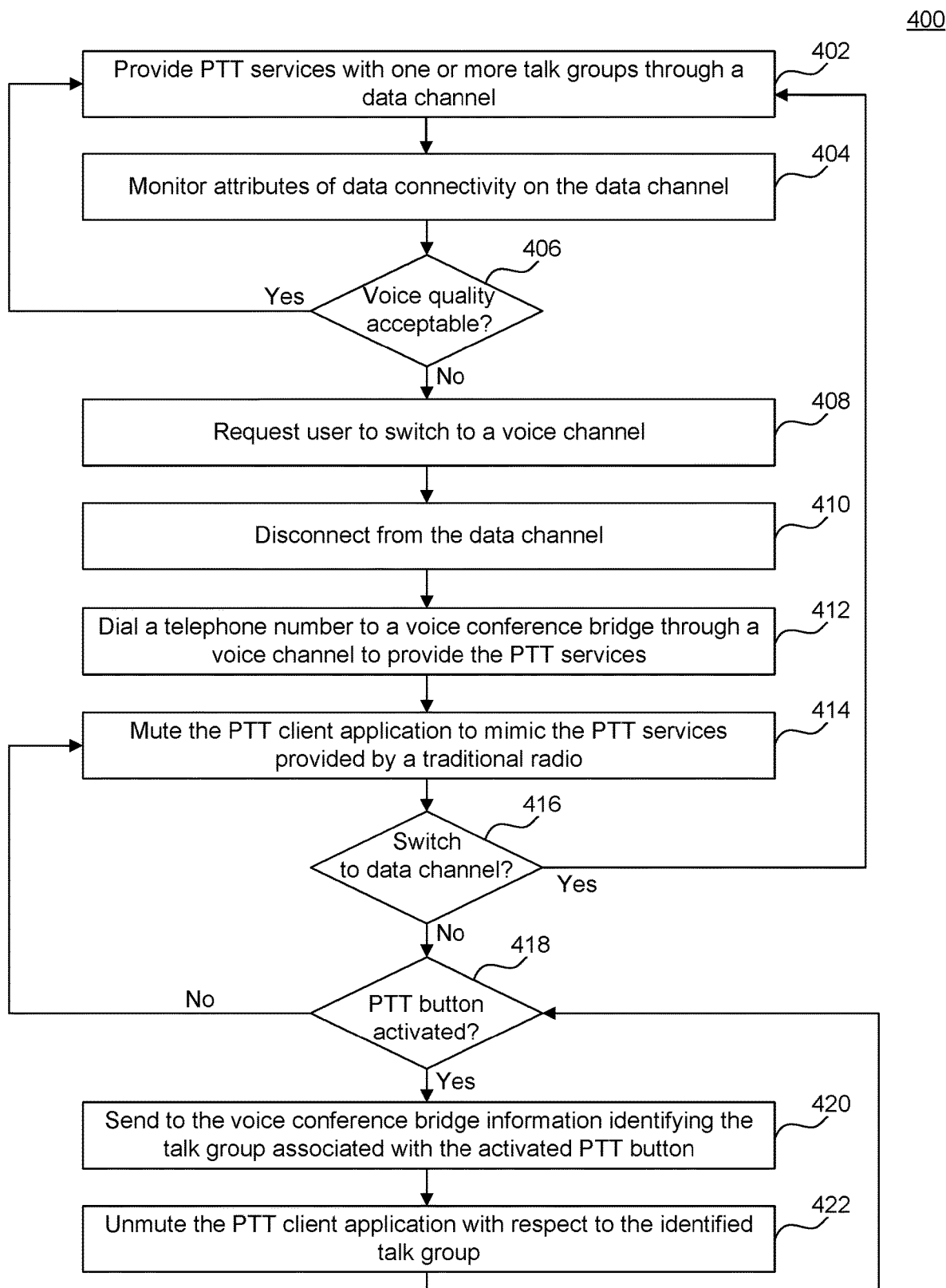
FIG. 4 is a flowchart illustrating a method for improving PTT connectivity at a PTT client application, according to an embodiment.

FIG. 4 is a flowchart of a method 400 for providing improved PTT connectivity with a PTT client application, according to an embodiment. The PTT client application connects to a mobile network, such as mobile network 103 supported by basestations 104 from FIG. 1, to provide a user with PTT services for a plurality of talk groups assigned or associated with that user. The user may operate the PTT client within a computing device, e.g., mobile device 102B from FIG. 1. Method 400 can be performed by processing logic that may comprise hardware (e.g., circuitry, dedicated logic, programmable logic, microcode, etc.), software (e.g., instructions running on a processing device), or a combination thereof.

In step 402, a PTT component within the PTT client application, such as PTT component 206 from FIG. 2, provides PTT services to the user by connecting to a data channel, such as data channel 136 of FIG. 1, that accesses the mobile network. The PTT component allows the user to use PTT services, such as PTT half-duplex communications, with each talk group in which the user belongs. The data channel further allows the user to communicate multimedia data with other members in the user's one or more talk groups.

In step 404, a voice monitoring component within the PTT client application, such as voice monitoring component 204 of FIG. 2, monitors or measures attributes of data connectivity on the data channel to determine when a voice quality falls below a threshold. Additionally, the monitoring may be performed periodically or throughout the steps of method 400.

In step 406, a connectivity component within the PTT client application, such as connectivity component 210 of FIG. 2, checks whether the determined voice quality is acceptable by comparing the computed quality value with a predetermined or preconfigured threshold. If the voice quality is acceptable, method 400 proceeds to step 402 where PTT services are maintained over the data channel.

In step 408, when the determined voice quality falls below the threshold, the connectivity component requests the user to switch the connectivity from the data channel to a voice channel, such as voice channel 138 of FIG. 1, for accessing the mobile network. Although switching to the voice channel from the data channel limits the types multimedia communications, the voice channel may provide more persistent voice communications. In an embodiment, the connectivity component directly switches to the voice channel without input from the use operating the PTT client application.

In step 410, the connectivity component disconnects from the data channel. In an embodiment, the connectivity component sends a termination request to end a current one or more multimedia SIP sessions, such as multimedia SIP session 330 of FIG. 3, for communicating with the user's one or more talk groups, such as talk group 344A of FIG. 3.

In step 412, the connectivity component dials a telephone number to a voice conference bridge, such as voice conference bridge 321 of FIG. 3, through a voice channel to provide the PTT services. Once the voice conference bridge processes the telephone number, the voice conference bridge provides the user access to each of the user's talk groups, such as talk groups 344A-D, by routing voice communications through the voice channel to and from voice communication sessions, such as voice SIP sessions 328A-D corresponding to respective talk groups 344A-D.

The telephone call may be routed to the voice conference bridge over a PSTN, such as PSTN 310 of FIG. 3. In an embodiment, the telephone number is preprogrammed within PTT client application. In an embodiment, the PTT client application additionally updates the telephone number based on updates received from agency system 320 or a third-party vendor maintaining or managing the voice conference bridge.

In step 414, the PTT component mutes a microphone of the PTT client application to mimic PTT services, such as PTT half-duplex voice communications, provided by a traditional radio device.

In step 416, the connectivity component checks whether to switch connectivity from the voice channel back to the data channel. As discussed with respect to step 404, the voice monitoring component may periodically monitor data attributes of data connectivity on the data channel to estimate or determine the voice quality. In an embodiment, when the voice quality is at an acceptable level, e.g., rises above a pre-configured threshold, the connectivity component further enables the user to switch to the data channel to access the PTT services and multimedia communications with each talk group. If the user confirms, the connectivity component terminates the current connectivity to the voice conference bridge via the voice channel. Then, method 400 proceeds to step 402. Otherwise, method 400 proceeds to step 418. In an embodiment, the connectivity component automatically switches connectivity to the data channel without user input or confirmation.

In step 418, the PTT component checks whether a PTT button corresponding to any talk group in which the user belongs has been activated. For example, the PTT component may detect that a virtual button, such as PTT button 306A of FIG. 3, within a screen of mobile device 302A has been selected by the use operating mobile device 302A. The virtual button may be selected via touch on touch screen, a computer mouse click, keyboard access, or other input means depending on the device operating the PTT client application.

In step 420, if the PTT button for a talk group has been activated, the PTT component sends to the voice conference bridge information identifying the talk group coupled to the activated PTT button. In an embodiment, the identification (ID) information may be a DTMF command, e.g., a sequence of telephone numbers, associated with the PTT button. To enable PTT voice communication with the talk group, the PTT component sends the DTMF command to the voice conference bridge via the voice channel. To manage ID information for each talk group and associated PTT button, PTT client application maintains a table (or other storage means) of associations between talk groups and ID information. The voice conference bridge processes the received ID information to route the PTT voice communications between the user and the talk group identified by the ID information.

In step 422, the PTT component unmutes the microphone of the PTT client application with respect to the talk group activated by the PTT button. Upon unmuting, the user may transmit voice communications to each member within the activated talk group so long as the PTT button continues to be activated. As shown, method 400 proceeds to step 418 where if the PTT button is de-activated, e.g., selected or clicked again, method 400 proceeds to step 414 where the PTT client is muted with respect to the talk group coupled to the de-activated or de-selected PTT button.

Figure 5:
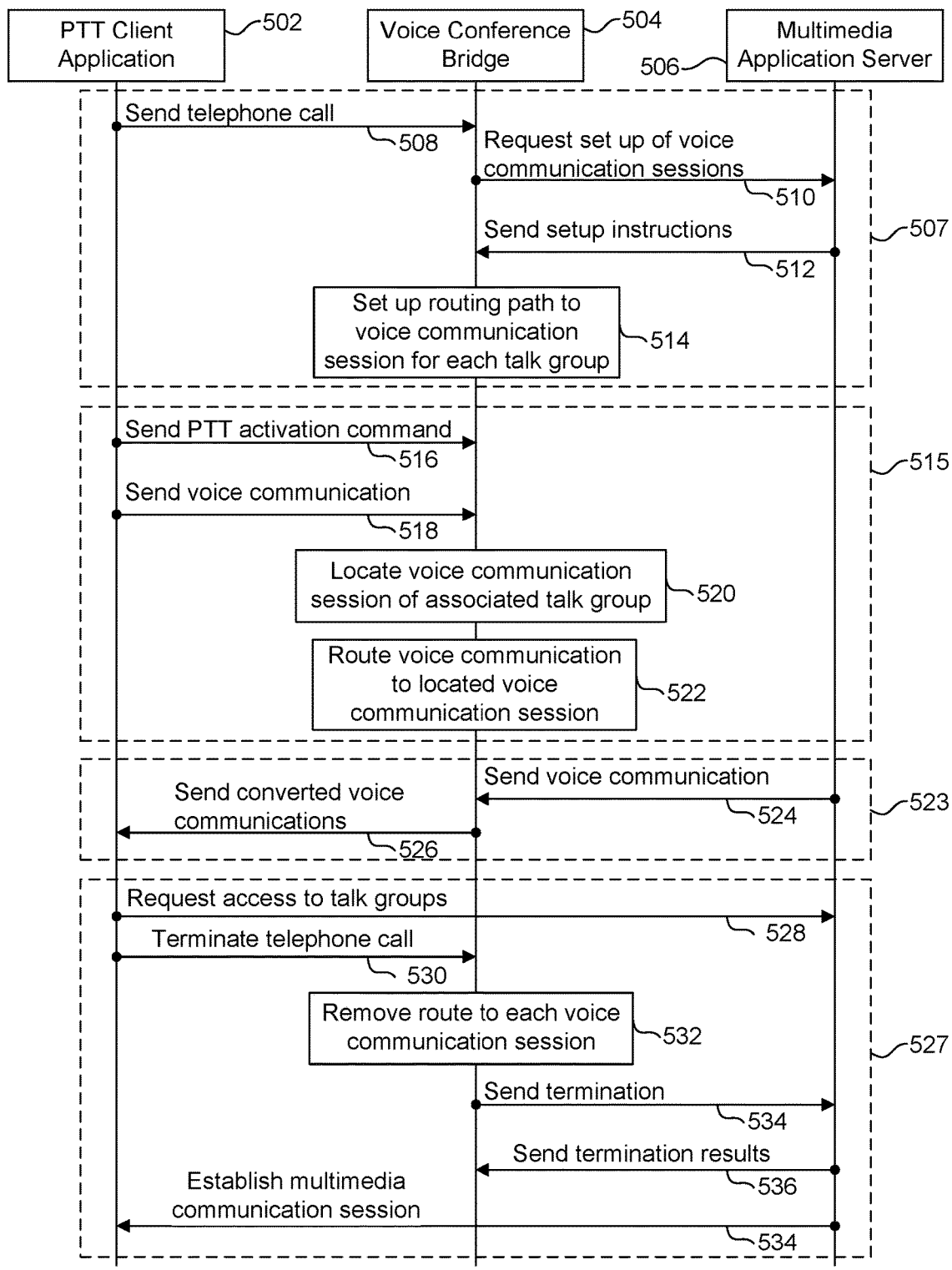
FIG. 5 is a sequence diagram illustrating a process for improving PTT connectivity at an agency system, according to an embodiment.

FIG. 5 is a sequence diagram of a process 500 for improving PTT connectivity at an agency system, particularly voice connectivity, according to an embodiment. Process 500 details how voice conference bridge 504 and multimedia application server 506 together provides improved PTT services and voice connectivity to a user operating PTT client application 502 on a computing device or a mobile device, such as mobile device 302A of FIG. 3.

Components 502, 504, and 506 may be representative of PTT client application 303, voice conference bridge 321, and multimedia application server 340 from FIG. 3, respectively. Voice conference bridge 504 and multimedia application server 506 may be managed or implemented by the agency system, such as agency system 320 of FIG. 3. In an embodiment, some or all of the functionality provided by the agency system, such as functionality of voice conference bridge 504, may be managed or implemented by a third-party vendor that interfaces with the agency system. Process 500 can be performed by processing logic that may comprise hardware (e.g., circuitry, dedicated logic, programmable logic, microcode, etc.), software (e.g., instructions run on a processing device), or a combination thereof.

For ease of understanding, steps of process 500 have been grouped into the application functions 507, 515, 523, and 527. Application function 507 provides PTT services to PTT client application 502 over a PSTN; application function 515 sends PTT voice communication from PTT client application 502 over the PSTN; application function 523 sends PTT voice communication to PTT client application 502 over the PSTN; and application 527 switches connectivity from a voice channel to a data channel to provide PTT services and voice communication to PTT client application 502.

Application function 507 illustrates steps 508-514 for providing to PTT client application 502 PTT services, including voice communication, over a PSTN, such as PSTN 310 of FIG. 3.

In step 508, voice conference bridge 504 receives a telephone call from a user's computing device operating PTT client application 502. In an embodiment, the telephone call is initiated by the computing device when PTT client application 502 determines that voice quality to one of the user's talk groups over a data channel fell below a threshold. In an embodiment, PTT client application 502 dials, via a voice channel, a preprogrammed telephone number routed to voice conference bridge via a PSTN, such as PSTN 310 of FIG. 3. In an embodiment, voice conference bridge 504 additionally receives, from the PSTN, an ANI identifying the user's computing device making the telephone call. The ANI may be associated with one or more of the user's talk groups.

In step 510, voice conference bridge 504 requests multimedia application server 506 to retrieve the plurality of talk groups in which the calling user belongs, and set up a voice communication sessions for each talk group. In an embodiment, the request includes the received ANI that is used by multimedia application server 506 to identify the user and his membership in specific talk groups.

Upon receiving the request, multimedia application server 506 queries a database or a table of ANI to locate talk groups associated with the received ANI. Then, multimedia application server 506 sets up respective voice communication sessions, such as voice SIP sessions 328A-D, for the user's talk group icons 304A-304D. Each of the voice communication sessions, e.g., voice SIP sessions 328A-D, provides PTT services and voice connectivity to a corresponding talk group, e.g., corresponding talk groups 344A-D.

In step 512, voice conference bridge 504 receives, from multimedia application server 506, instructions that indicate each of the user's talk groups and respective voice communication sessions. In an embodiment, the instruction may be to connect to a newly created voice communication session or an existing voice communication session.

In step 514, for each of the user's talk groups, voice conference bridge 504 sets up a routing path to a corresponding voice communication session such that PTT voice communications for that talk group are routed through the voice communication session.

Application function 515 illustrates steps 516-522 for sending PTT voice communication from PTT client application 502 over the PSTN.

In step 516, voice conference bridge 504 receives, over the PSTN, a PTT activation message or command from PTT client 502 to talk to members of a talk group. In an embodiment, the PTT activation message is a DTMF command, e.g., a four-digit sequence of telephone numbers.

In step 518, voice conference bridge 504 receives voice communication from PTT client application 502 over the PTSN. Upon receiving the voice communication, voice conference bridge 504 converts the voice communication into a packetized form for transmitting over the LAN or other IP networks to multimedia application server 506.

In step 520, voice conference bridge 504 uses the received PTT activation command from step 516 to locate a voice communication session associated with the talk group identified by the PTT activation command. For example, voice conference bridge 504 may perform a lookup operation on a table or database storing, for each user, PTT activation commands and associated voice communication sessions.

In step 522, voice conference bridge 504 routes the converted voice communication from step 516 to the appropriate talk group via the located voice communication session of step 520.

Application function 523 illustrates steps 524-526 for sending PTT voice communication to PTT client application 502 over the PSTN.

In step 524, voice conference bridge 504 receives voice communications from a talk group, such as talk group 344A of FIG. 3, via a corresponding voice communication session, such as voice SIP session 328A. The voice communication may be received as network packets and received over a LAN, such as LAN 326, if the agency system implements the voice conference bridge 504. Otherwise, voice conference bridge 504 receives the voice communication via an IP network, such as IP network 312. Upon receiving the voice communications, voice conference bridge 504 performs gateway functions to convert the voice communication into a form suitable for transmitting over the PSTN and the voice channel, both of which may maintain communications via a circuit-switched design.

In step 526, voice conference bridge 504 sends the converted voice communication over the PSTN to PTT client application 502. For example, voice communications from talk group 344A are sent to PTT client application 303 as voice communication from talk group "PATROL" indicated by talk group icon 304A on PTT client application 303.

Application function 527 illustrates steps 528-538 for switching connectivity from a voice channel to a data channel to provide PTT services and voice communication to PTT client application 502.

In step 528, multimedia application server 506 receives, over an IP network, such as IP network 312 of FIG. 3, a request from PTT client application 502 to access the user's talk groups.

In step 530, voice conference bridge 530 receives a request, over the PSTN, from PTT client application 502 to terminate the telephone call providing the PTT voice connectivity to the user's talk groups maintained at multimedia application server 506. Upon receiving the request, voice conference bridge 530 looks up the user's associated talk groups based on received user ID, such as ANI.

In step 532, for each of the user's talk groups, voice conference bridge 530 removes a route to a voice communication session for accessing that talk group at the multimedia application server 506. In an embodiment, voice conference bridge 530 tracks whether one or more telephone calls from respective users are being routed through each active voice communication session.

In step 534, if a voice communication session no longer has any routed telephone calls, i.e., the user requesting termination in step 530 was the only user accessing that voice communication session, then voice conference bridge 530 requests multimedia application server 506 to terminate that voice communication session.

In step 536, voice conference bridge 530 receives results or acknowledgements from multimedia application server 506 and remove the identified voice communication session of step 534 as an existing or active voice communication session.

In step 538, responsive to step 528, multimedia application server 506 establishes a multimedia communication session, such as multimedia SIP session 330 of FIG. 3. In an embodiment, multimedia application server 506 maintains the multimedia communication session to provide PTT services, over IP network 312 of FIG. 3, to PTT client application 502 using VOIP technology.

Computer System Implementation

Figure 6:
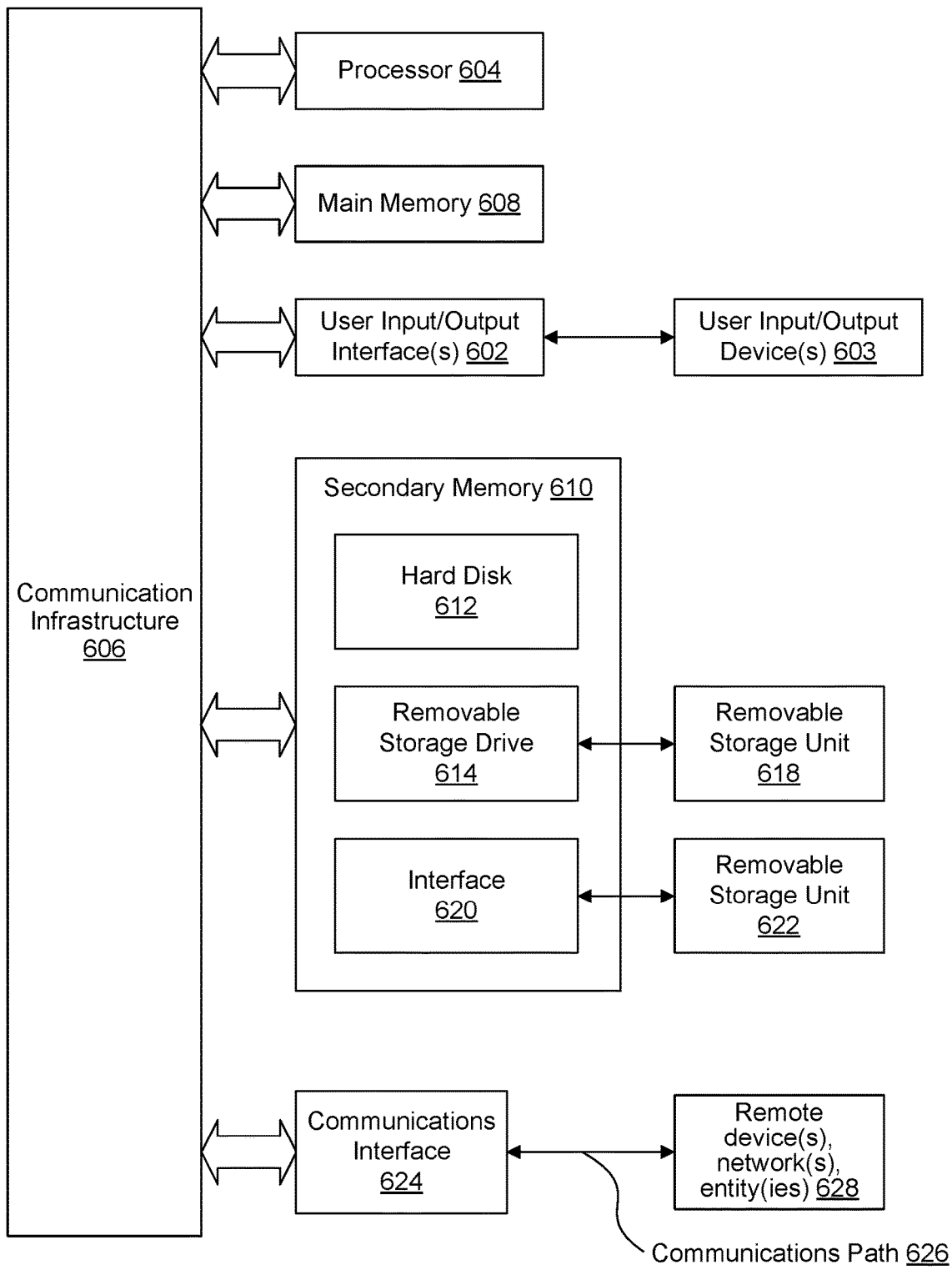
FIG. 6 is a diagram of an example computing system, according to an embodiment.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) or data.

Computer system 600 may also include one or more secondary storage devices or memory 610. Secondary memory 610 may include, for example, a hard disk drive 612 or a removable storage device or drive 614. Removable storage drive 614 may be a floppy disk drive, a magnetic tape drive, a compact disk drive, an optical storage device, tape backup device, or any other storage device/drive.

Removable storage drive 614 may interact with a removable storage unit 618. Removable storage unit 618 includes a computer usable or readable storage device having stored thereon computer software (control logic) or data. Removable storage unit 618 may be a floppy disk, magnetic tape, compact disk, DVD, optical storage disk, and/any other computer data storage device. Removable storage drive 614 reads from or writes to removable storage unit 618 in a well-known manner.

According to an exemplary embodiment, secondary memory 610 may include other means, instrumentalities or other approaches for allowing computer programs or other instructions or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired or wireless, and which may include any combination of LANs, WANs, the Internet, etc. Control logic or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems or computer architectures other than that shown in FIG. 6. In particular, embodiments may operate with software, hardware, or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
   a memory;
   one or more processors coupled to the memory, wherein the one or more processors are configured to:
   receive a telephone call from a computing device operated by a user, wherein the telephone call comprises an automatic number identification (ANI) identifying the computing device, wherein the computing device initiates the telephone call after determining that a voice quality associated with a data channel satisfies a threshold, wherein one or more talk groups are associated with the ANI;
   set up a voice session initiation protocol (SIP) session corresponding to a first talk group of the one or more talk groups associated with the ANI;
   route a first push-to-talk (PTT) communication associated with the first talk group via the voice SIP session;
   receive, via an Internet Protocol (IP) network, a request from a PTT client application to access the first talk group; and
   establish a multimedia SIP session that corresponds to the first talk group with the PTT client application, while maintaining the voice SIP session.

2. The system of claim 1, wherein the one or more processors are further configured to:
   receive from the computing device, a talk group identification (ID) associated with the first talk group of the one or more talk groups; and
   based on the talk group ID, locate the voice SIP session.

3. The system of claim 1, wherein the request comprises a second PTT communication in a packetized form.

4. The system of claim 1, wherein the one or more processors are further configured to:
   receive a second PTT communication associated with the first talk group; and transmit the second PTT communication via the voice SIP session and the multimedia SIP session.

5. The system of claim 1, wherein the one or more processors are further configured to:
maintain the multimedia SIP session to provide PTT services over the IP network using Voice over IP (VOIP) technology.

6. The system of claim 5, wherein the PTT services comprise half-duplex or full duplex communications.

7. The system of claim 1, wherein the one or more processors are further configured to:
receive from the computing device, a command to terminate the telephone call; and
determine whether one or more telephone calls are being routed through the voice SIP session or an other voice SIP session, wherein the other voice SIP session is also associated with the ANI.

8. The system of claim 7, wherein the one or more processors are further configured to:
determine that telephone calls are not routed through the voice SIP session or the other voice SIP session; and
remove the voice SIP session and the other voice SIP session.

9. The system of claim 1, wherein the voice SIP session is newly created.

10. The system of claim 1, wherein the voice SIP session of a corresponding voice communication sessions was previously created.

11. A method, comprising:
receiving a telephone call from a computing device operated by a user, wherein the telephone call comprises an automatic number identification (ANI) identifying the computing device, wherein the computing device initiates the telephone call after determining that a voice quality associated with a data channel satisfies a threshold, wherein one or more talk groups are associated with the ANI;
setting up a voice session initiation protocol (SIP) session corresponding to a first talk group of the one or more talk groups associated with the ANI;
routing a first push-to-talk (PTT) communication associated with the first talk group via the voice SIP session;
receiving, via an Internet Protocol (IP) network, a request from a PTT client application to access the first talk group; and
establishing a multimedia SIP session that corresponds to the first talk group with the PTT client application, while maintaining the voice SIP session.

12. The method of claim 11, further comprising:
receiving from the computing device, a talk group identification (ID) associated with the first talk group of the one or more talk groups; and
based on the talk group ID, locating the voice SIP session.

13. The method of claim 11, further comprising:
receiving a second PTT communication associated with the first talk group; and
transmitting the second PTT communication via the voice SIP session and the multimedia SIP session.

14. The method of claim 11, further comprising:
maintaining the multimedia SIP session to provide PTT services over the IP network using Voice over IP (VOIP) technology.

15. The method of claim 11, further comprising:
receiving from the computing device, a command to terminate the telephone call; and
determining whether one or more telephone calls are being routed through the voice SIP session or an other voice SIP session, wherein the other voice SIP session is also associated with the ANI.

16. The method of claim 15, further comprising:
determining that telephone calls are not routed through the voice SIP session or the other voice SIP session; and
removing the voice SIP session and the other voice SIP session.

17. A non-transitory computer-readable medium storing instructions that, when executed by a processor of a first electronic device, cause the processor to perform operations, the operations comprising:
receiving a telephone call from a computing device operated by a user, wherein the telephone call comprises an automatic number identification (ANI) identifying the computing device, wherein the computing device initiates the telephone call after determining that a voice quality associated with a data channel satisfies a threshold, wherein one or more talk groups are associated with the ANI;
setting up a voice session initiation protocol (SIP) session corresponding to a first talk group of the one or more talk groups associated with the ANI;
routing a first push-to-talk (PTT) communication associated with the first talk group via the voice SIP session;
receiving, via an Internet Protocol (IP) network, a request from a PTT client application to access the first talk group; and
establishing a multimedia SIP session that corresponds to the first talk group with the PTT client application, while maintaining the voice SIP session.

18. The non-transitory computer-readable medium of claim 17, further comprising:
receiving a second PTT communication associated with the first talk group; and
transmitting the second PTT communication via the voice SIP session and the multimedia SIP session.

19. The non-transitory computer-readable medium of claim 17, further comprising:
maintaining the multimedia SIP session to provide PTT services over the IP network using Voice over IP (VOIP) technology.

20. The non-transitory computer-readable medium of claim 17, further comprising:
receiving from the computing device, a command to terminate the telephone call; and
determining whether one or more telephone calls are being routed through the voice SIP session or an other voice SIP session, wherein the other voice SIP session is also associated with the ANI.

* * * * *